US006101426A

United States Patent [19]

Kimura et al.

[11] Patent Number: 6,101,426
[45] Date of Patent: Aug. 8, 2000

[54] SHEET FEEDING DEVICE AND CORRECTION METHOD OF SHEET FEED AMOUNT IN THE SHEET FEEDING DEVICE

[75] Inventors: Shinji Kimura, Kani; Tsuyoshi Kushida, Iwakura, both of Japan

[73] Assignee: Brother Kogyo Kabushiki Kaisha, Nagoya, Japan

[21] Appl. No.: 09/121,824

[22] Filed: Jul. 24, 1998

[30] Foreign Application Priority Data

Jul. 29, 1997 [JP] Japan .................................... 9-202715

[51] Int. Cl.[7] .................................................. G06F 7/00

[52] U.S. Cl. ...................................... 700/219; 271/265.01

[58] Field of Search .................................... 700/220, 219, 700/223; 271/265.01, 114, 288, 258.01; 270/52.14, 52.16, 52.21, 52.22

[56] References Cited

U.S. PATENT DOCUMENTS 4,757,984 7/1988 Rowe et al. ............................ 364/470
5,019,841 5/1991 Fulton et al. ......................... 346/153.1
5,732,944 3/1998 Mayer ................................ 271/265.01
5,951,180 9/1999 Kawaura ................................ 400/629

*Primary Examiner*—Christopher P. Ellis
*Assistant Examiner*—Khoi H. Tran
*Attorney, Agent, or Firm*—Oliff & Berridge, PLC

[57] ABSTRACT

A sheet feeding device has a correction value storage memory which stores correction values for the sheet feed error of the sheet feeding mechanism which appears in a specific cycle from a reference point to correct the sheet feed error, and a sensor which detects a particular point in the specific cycle. In accordance with the input from the sensor, the sheet feed amount is corrected by the correction value stored in the correction value storage memory. By correcting the feed error of each component of the sheet feeding mechanism, an exact and reliable sheet feed can be achieved without needing the increase of precision of the components of the sheet feeding mechanism.

16 Claims, 8 Drawing Sheets

FIG. 6

| SECTION | CORRECTION FACTOR(%) |
|---|---|
| 0 | 1 |
| 1 | 2 |
| 2 | 2 |
| 3 | 4 |
| 4 | 3 |
| 5 | 2 |
| 6 | 1 |
| 7 | −1 |
| 8 | −2 |
| 9 | −2 |

SHEET FEEDING DEVICE AND CORRECTION METHOD OF SHEET FEED AMOUNT IN THE SHEET FEEDING DEVICE

BACKGROUND OF THE INVENTION

1. Field of the Invention

The present invention relates to a sheet feeding device, and more particularly to a sheet feeding device which feeds sheets such as recording paper and the like and which is incorporated in a printing apparatus such as a printer.

2. Description of Related Art

Heretofore, a printing apparatus such as a printer incorporates a sheet feeding device which sequentially feeds sheets in synchronization with a printing operation of a print head on the sheets.

This type of sheet feeding device consists of a feed roller for feeding sheets and a pulse motor for driving the feed roller. The device is arranged so that a CPU serving as a drive control means sends a predetermined number of pulses to the pulse motor so that a sheet is fed at a predetermined feed amount.

It is necessary for an appropriate printing on the sheet to correctly feed the sheet. However, even if the pulses corresponding to the predetermined feed amount are transmitted from the CPU to the pulse motor, it is actually difficult to exactly feed the sheet at a desired feed amount due to deflection of the feed roller or the gears which transmit the driving power from the pulse motor to the feed roller.

Therefore the components of the sheet feeding device, e.g., the feed roller and others, have been improved to have high precision so as to ensure that the accuracy of sheet feed is increased. However, there is a limit to the correction of the feed error even if the precision of components is increased, resulting in increased manufacturing costs.

SUMMARY OF THE INVENTION

The present invention has been made in view of the above circumstances and has an object to overcome the above problems and to provide a sheet feeding device whereby sheets can accurately be fed at a desired feed amount without necessitating the increase of precision of components such as a feed roller.

Additional objects and advantages of the invention will be set forth in part in the description which follows and in part will be obvious from the description, or may be learned by practice of the invention.

To achieve the objects and in accordance with the purpose of the invention, as embodied and broadly described herein, there is provided a sheet feeding device comprising a sheet feeding mechanism and a drive-controller for drive-controlling the sheet feeding mechanism, the sheet feeding device further comprising a correction value storage memory which stores correction values each corresponding to one of plural points in a specific cycle, the correction values being to be used for correcting sheet feed error of the sheet feeding mechanism, which appears in a specific cycle from a reference point, and a detector which detects the reference point in the specific cycle, wherein when the reference point in the specific cycle is detected by the detector, the drive-controller corrects the sheet feed amount of the sheet feeding mechanism in accordance with the correction values stored in the correction value storage memory.

According to the above structure, since the correction value storage memory stores correction values used to correct the sheet feed error in the sheet feeding mechanism which appears in the specific cycle from the reference point in correspondence with the feed error at each point in the specific cycle, the feed error at each point is corrected by the correction value based on the detection result by the detector at the particular point in the specific cycle, so that each feed error of the components of the sheet feeding mechanism can be easily corrected. Accordingly, the exact and reliable sheet feed can be achieved without needing the increase of precision of the sheet feeding mechanism.

According to the second aspect of the present invention, there is provided a correction method of sheet feed amount in a sheet feeding device comprising a sheet feeding mechanism and a drive-controller for drive-controlling the sheet feeding mechanism, the correction method comprising the steps of detecting sheet feed error of the sheet feeding of the sheet feeding mechanism, which appears in a specific cycle from a reference point, storing correction values for the feed error in a correction value storage memory, the correction values being in one-by-one correspondence with a plurality of points in the specific cycle, detecting the reference point in the specific cycle, and correcting the sheet feed amount of the sheet feeding mechanism in accordance with the correction values stored in the correction value storage memory when the reference point in the specific cycle is detected by a detector.

According to the above correction method, the sheet feed error of the sheet feeding mechanism, which appears in a specific cycle from a reference point, is corrected by the correction values for the feed error set on a point-by-point basis in each point in the specific cycle stored in the correction value storage memory, whereby to correct the sheet feed amount of the sheet feeding mechanism. Accordingly, the sheet feed error of the sheet feeding mechanism can be easily corrected, achieving a correct and reliable sheet feed without increasing the component precision of the sheet feeding mechanism.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention. In the drawings.

FIG. 6 is a table of the correction values of FIG. 5;

DETAILED DESCRIPTION OF THE PREFERRED EMBODIMENTS

A detailed description of one preferred embodiment of a sheet feeding device embodying the present invention will now be given referring to the accompanying drawings.

Figure 1:
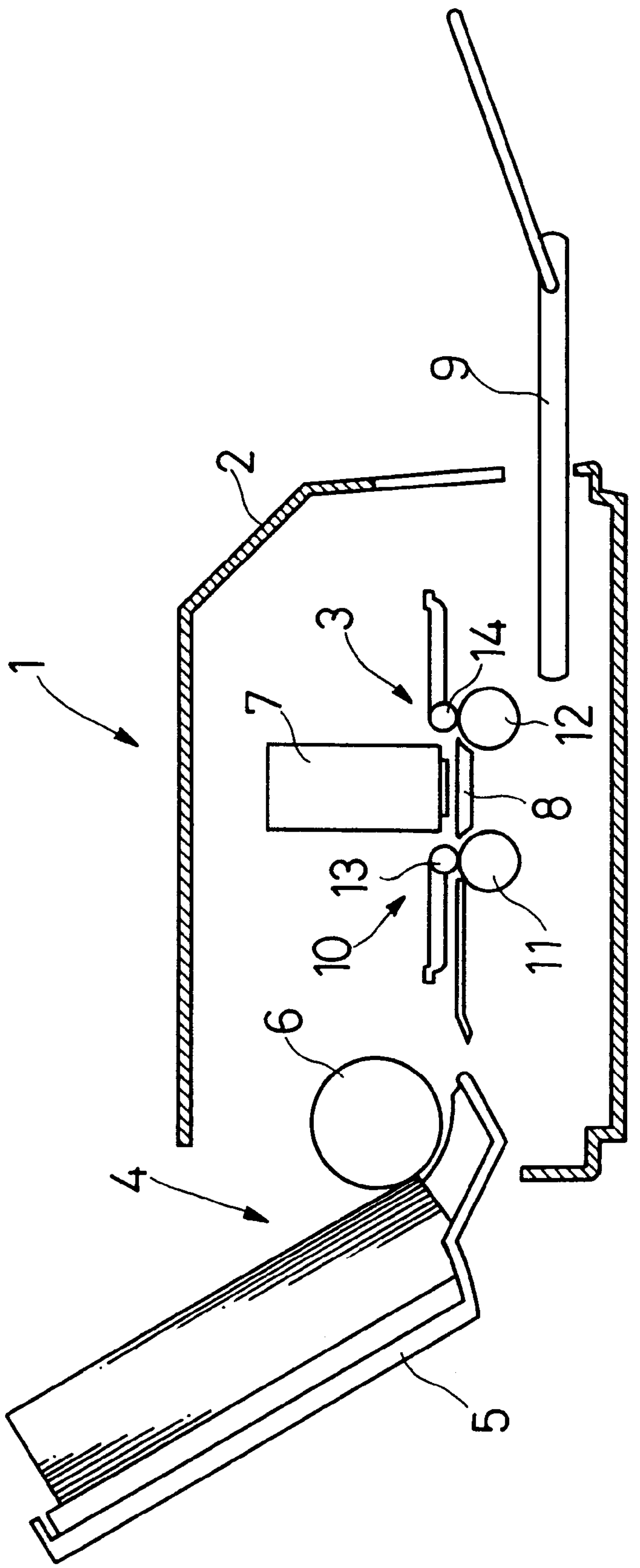
FIG. 1 is a side view of main components of a printing apparatus incorporating a sheet feeding device in an embodiment according to the present invention.

FIG. 1 is a side view of main components of a printing apparatus incorporating a sheet feeding device in an embodiment according to the present invention.

In FIG. 1, the printing apparatus 1 has a casing 2, a print unit 3, and a sheet supply mechanism 4 disposed in the rear side of the casing 2 to supply sheets such as printing paper to the print unit 3. The sheet supply mechanism 4 consists of a supply tray 5 which accommodates therein a stack of sheets and a supply roller 6 disposed at a lower end side of the tray 5. The sheets set in the supply tray 5 are picked up by the roller 6 one by one to be supplied to the print unit 3.

The print unit 3 is provided with a print head 7 which prints images on a sheet and a platen 8 which supports the sheet. The print head 7 is mounted on a carriage not shown and is designed so as to perform one printing per scan by the drive of a carriage motor 19 (see FIG. 3) which operates to move the carriage. With the repetition of the printing operation, all printing data are printed on the sheet. The so printed sheet in the print unit 3 is discharged onto an output tray 9.

Figure 2:
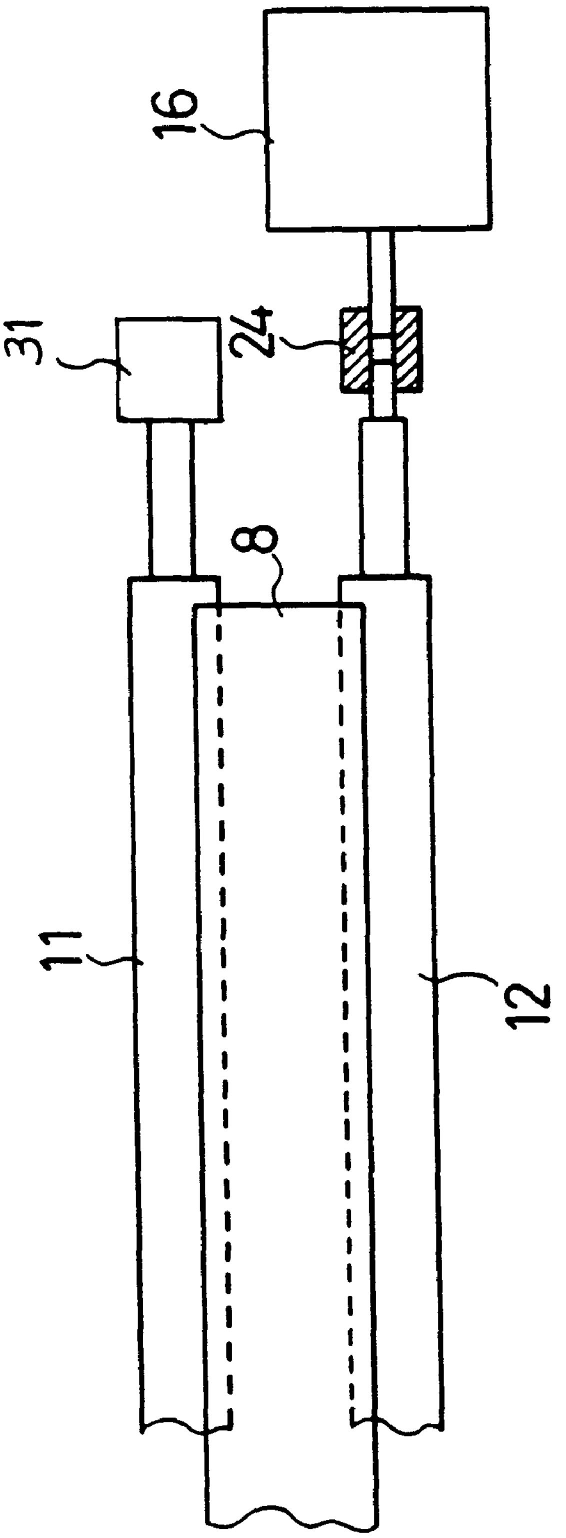
FIG. 2 is a schematic top view of main parts of the sheet feeding device of FIG. 1.

In the present embodiment, a sheet feeding device is incorporated in the print unit 3 of the printing apparatus 1. The sheet feeding device has a sheet feeding mechanism 10 for feeding sheets and a CPU 23 (see FIG. 3) serving as a drive controller which controls the sheet feeding mechanism 10 to feed sheets at a predetermined feed amount. FIG. 2 is a schematic top view of the main parts of the sheet feeding device.

In FIGS. 1 and 2, the sheet feeding mechanism 10 consists of a feed roller 11 and an output roller 12. The feed roller 11 is disposed on an upstream side of the platen 8 and operates to transfer a sheet. The output roller 12 is disposed on a downstream side of the platen 8 and is driven in synchronization of the feed roller 11 to cause the discharge of the sheet. Those feed roller 11 and output roller 12 are connected via a gear train not shown to a pulse motor 15 (see FIG. 3) serving as a power source.

On the feed roller 11 at its shaft end, a sensor 31 which detects a specific rotation position of the feed roller 11 is mounted (see FIG. 3), and an encoder 16 is removably attached via a coupling 24 if required to detect an angle of rotation of the feed roller 11. This encoder 16 can detect the rotation angle of the feed roller 11 by, for example, dividing one rotation of 360 degrees in thousand. A nip roller 13 which is rotated by the rotation of the feed roller 11 is arranged opposite to the feed roller 11 through a sheet. Another nip roller 14 which is rotated by the rotation of the output roller 12 is arranged opposite to the output roller 12. The reference sensor 31 may consist of any one of various types of sensors which can detect a specific rotation position, e.g., optical sensor, magnetic sensor, or mechanical sensor.

Figure 3:
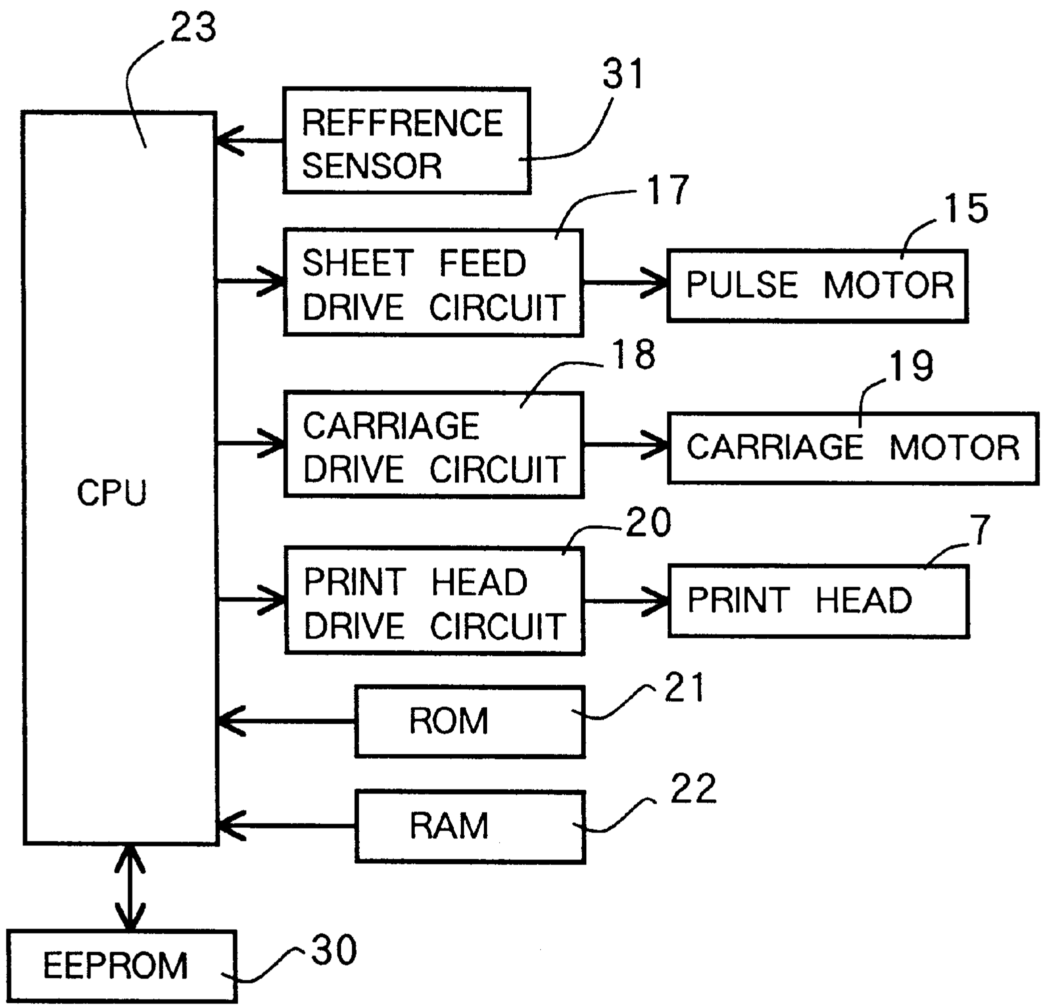
FIG. 3 is a block diagram of a control system of the printing apparatus in FIG. 1.

In FIG. 3, the CPU 23 is connected to a sheet feed driving circuit 17 which drives the pulse motor 15, a carriage driving circuit 18 which drives the carriage motor 19, a print head driving circuit 20 which drives the print head 7, the reference sensor 31, a ROM 21, a RAM 22, and an EEPROM (electrically erasable programmable ROM) 30. The ROM 21 stores a control head program for controlling the drive circuits 17, 18, and 20 to operate in accordance with produced print data and a correction program for correcting the sheet feed amount by the correction values which will be mentioned later. The EEPROM 30 which functions as correction value storage memory stores the correction values used for the correction of the sheet feed amount. In the RAM 22, set are various memories, buffers, and a work area for provisional storage of the correction program when executed.

The correction values stored in the EEPROM 30 are used to correct the sheet feed error caused by deflection of the sheet feeding mechanism 10, especially, the feed roller 11 or the gears which transmits the driving power of the pulse motor 15 to the feed roller 11. The sheet feed error of the sheet feeding mechanism 10 appears in a specific cycle from a certain reference point that is a specific rotation position detected by the sensor 31. The correction values are set corresponding to each feed error at each point in the specific cycle. More specifically, the sheet feed error appearing in the specific cycle from the reference point is divided into plural sections and the correction values are set on a section-by-section basis. The set values are then stored in a correction value table in the EEPROM 30.

The correction value table inherent to each device is made in a manufacturing process. In other words, in the manufacturing process, the feed error of the sheet feeding mechanism 10 which appears in a specific cycle is detected by the use of the encoder 16 and the correction value corresponding to the detected feed error is stored in advance in the EEPROM 30. In the actual correction control, the correction of the sheet feed error is performed such that a particular point is detected by a sensor which detects only the particular point, and the number of pulses is counted from the time at which the particular point is detected. According to such the correction control, the feed error at each point in the specific cycle can be exactly and surely corrected by the correction value. That is to say, if the correction control of sheet feed amount is made by detecting the reference point by the use of the reference sensor 31 which detects a reference point, and by counting the number of pulses on a base of the time at which the reference point is detected, more exact and reliable correction of the feed error at each point of time in the specific cycle can be made by the correction values.

Figure 4:
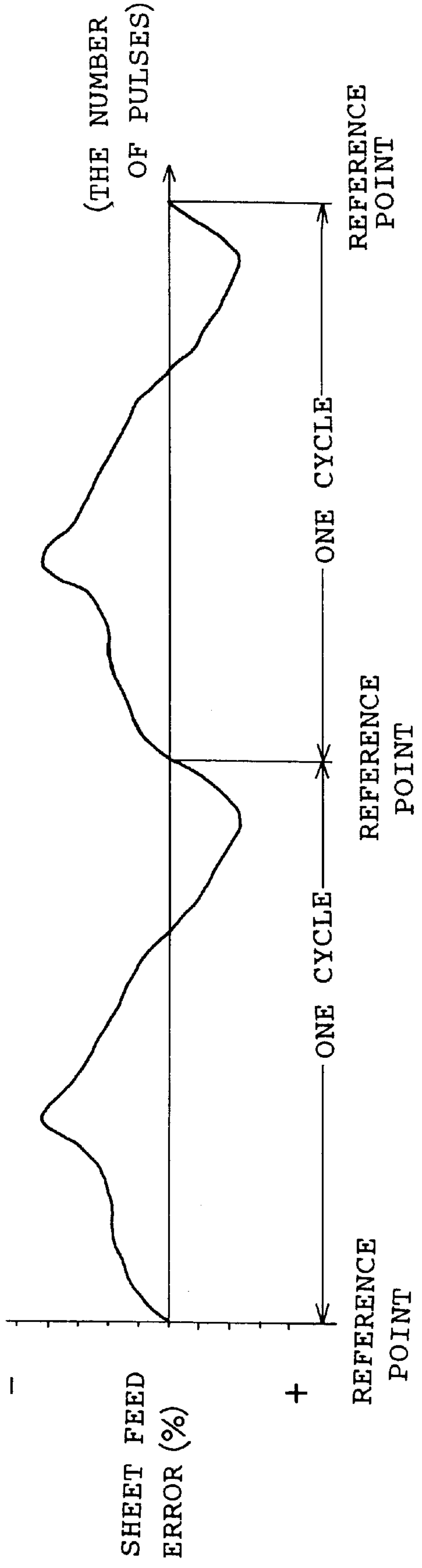
FIG. 4 is a chart showing an example of the sheet feed error of a sheet feeding mechanism, which appears in a specific cycle from a reference point.
Figure 5:
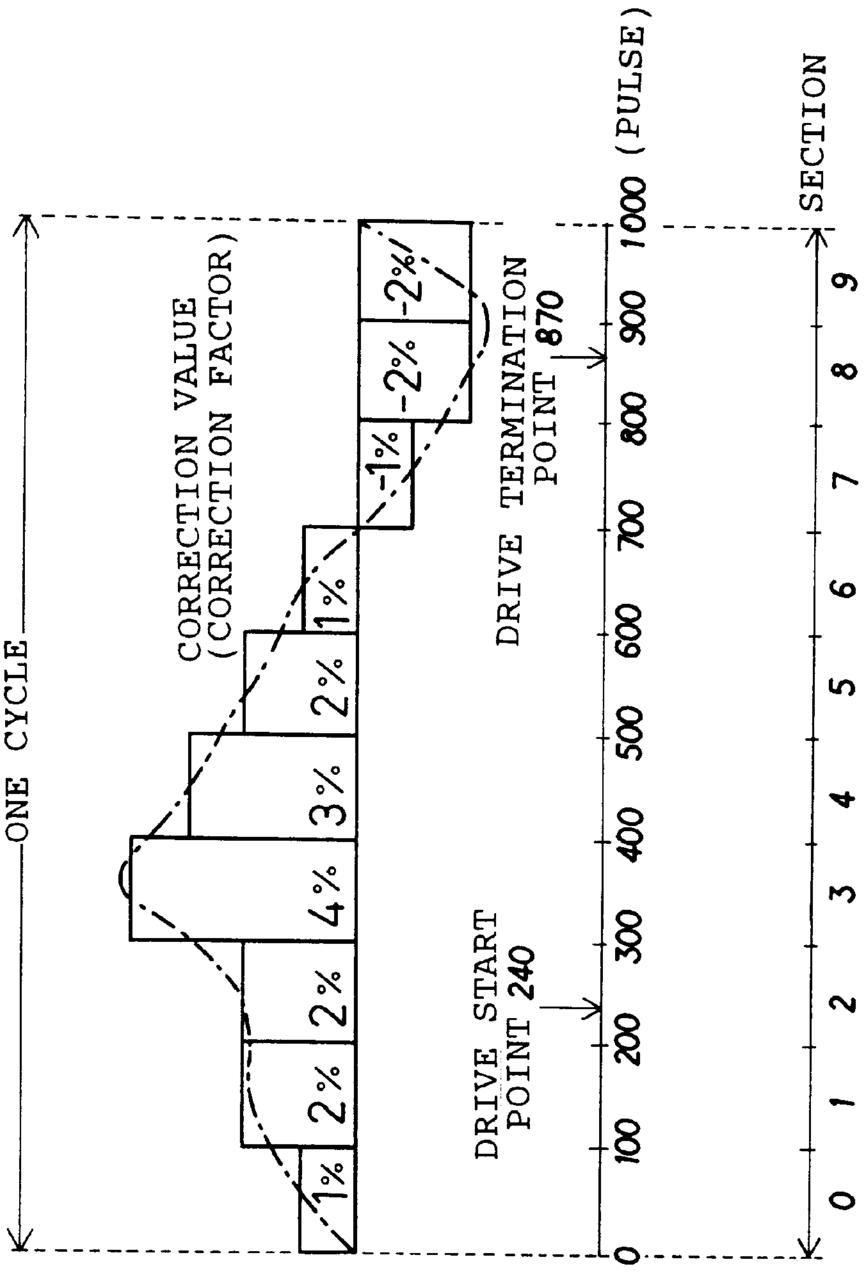
FIG. 5 is an explanatory view to set correction values by dividing the sheet feed error of FIG. 4 into a plurality of sections.

FIG. 4 is an illustration showing the sheet feed error of the sheet feed mechanism 10 which appears in a specific cycle from a certain reference point. The feed error shown in FIG. 4 can be obtained by counting the number of pulses supplied to the pulse motor 15 and sequentially detecting an angle of rotation of a roller shaft of the feed roller 11 from the encoder 16. As shown in FIG. 5, one cycle of sheet feed error obtained is then divided into a plurality of sections, and the correction value for the feed error is set on a section-by-section basis. In FIG. 5, one cycle is assumed as 1000 pulses. For example, this cycle is divided into 10 sections, namely, each section being 100 pulses, and then the correction value is set on the section-by-section basis. This correction value is set as a correction factor to a proper sheet feed amount. The number of pulses to be corrected in the section can be calculated by multiplying the number of pulses in each section by this correction factor. In such a manner, the sheet feed amount and each correction value can be specified by the number of pulses, the corrected sheet feed amount can be provided to the pulse motor 15 in the as-unchanged form of the number of pulses, and therefore the control of the sheet feed can be simplified. In this case, a minimum unit of the sheet feed amount is specified by a particular number of pulses at which the pulse motor 15 is driven. More specifically, the minimum unit of sheet, namely, 1/600-inch sheet is fed by 3 pulses so that a resolution of 600 dpi (dot per inch) can be obtained in a direction of sheet feed. Since this causes a minimum feed unit to be specified by a particular number of pulses, the sheet feed amount and an amount of correction can be easily determined from the number of pulses, and thus a simple constitution can ensure that the control is accomplished. In this case, a particular number of pulses, that is, the number of pulses corresponding to the minimum feed unit can be set as large as possible, whereby the more exact correction can be performed. The set correction factors are then allowed to correspond to the divisional sections, so that a correction value table as shown in FIG. 6 is made. The correction value table is then stored in a predetermined storage area in EEPROM 30. The encoder 16 and coupling 24 are removed after terminating the storage of the correction value table.

Figure 7:
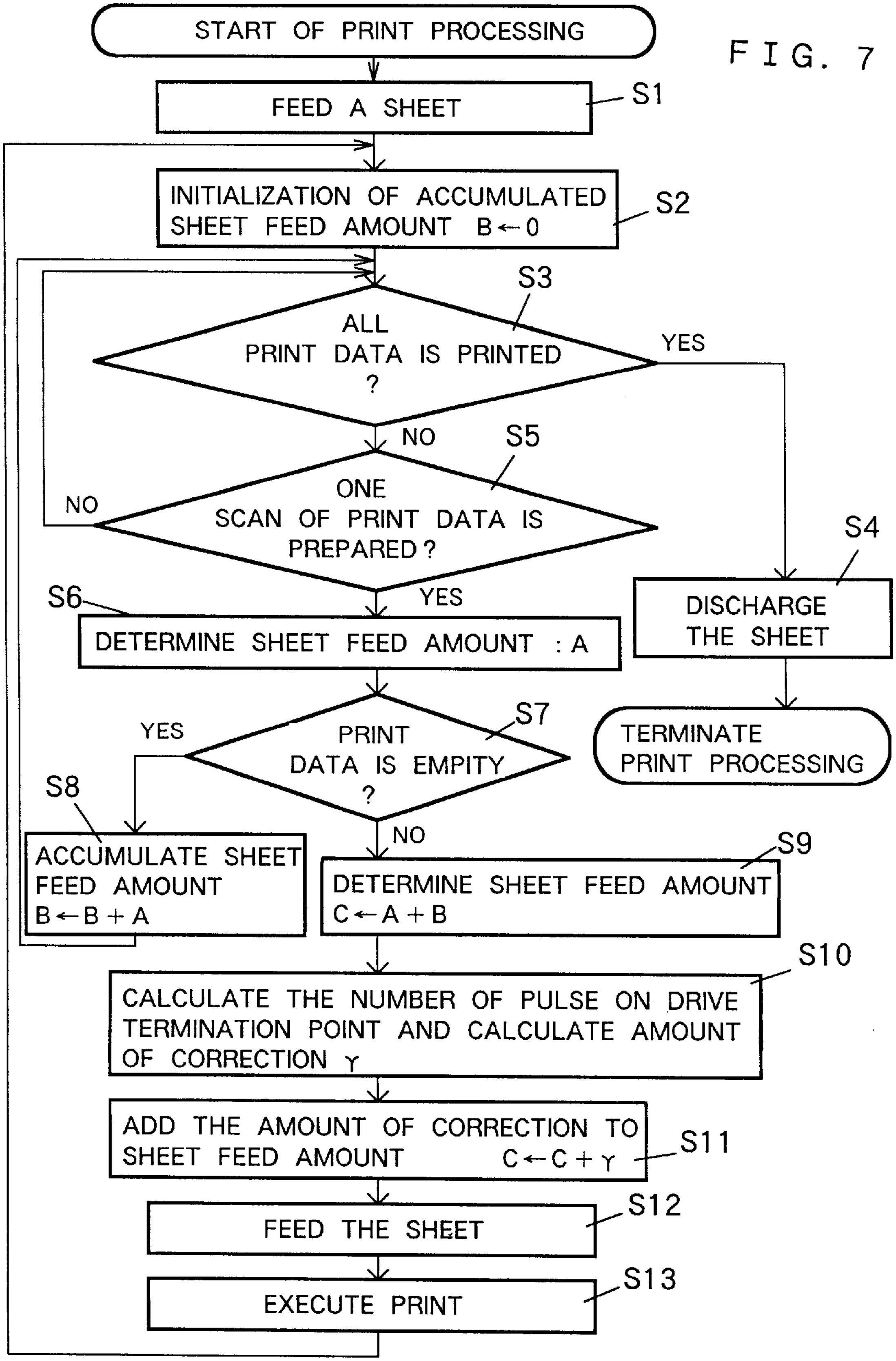
FIG. 7 is a flow chart of the control of print processing including the control for correcting the sheet feed amount by the use of the correction value table.
Figure 8:
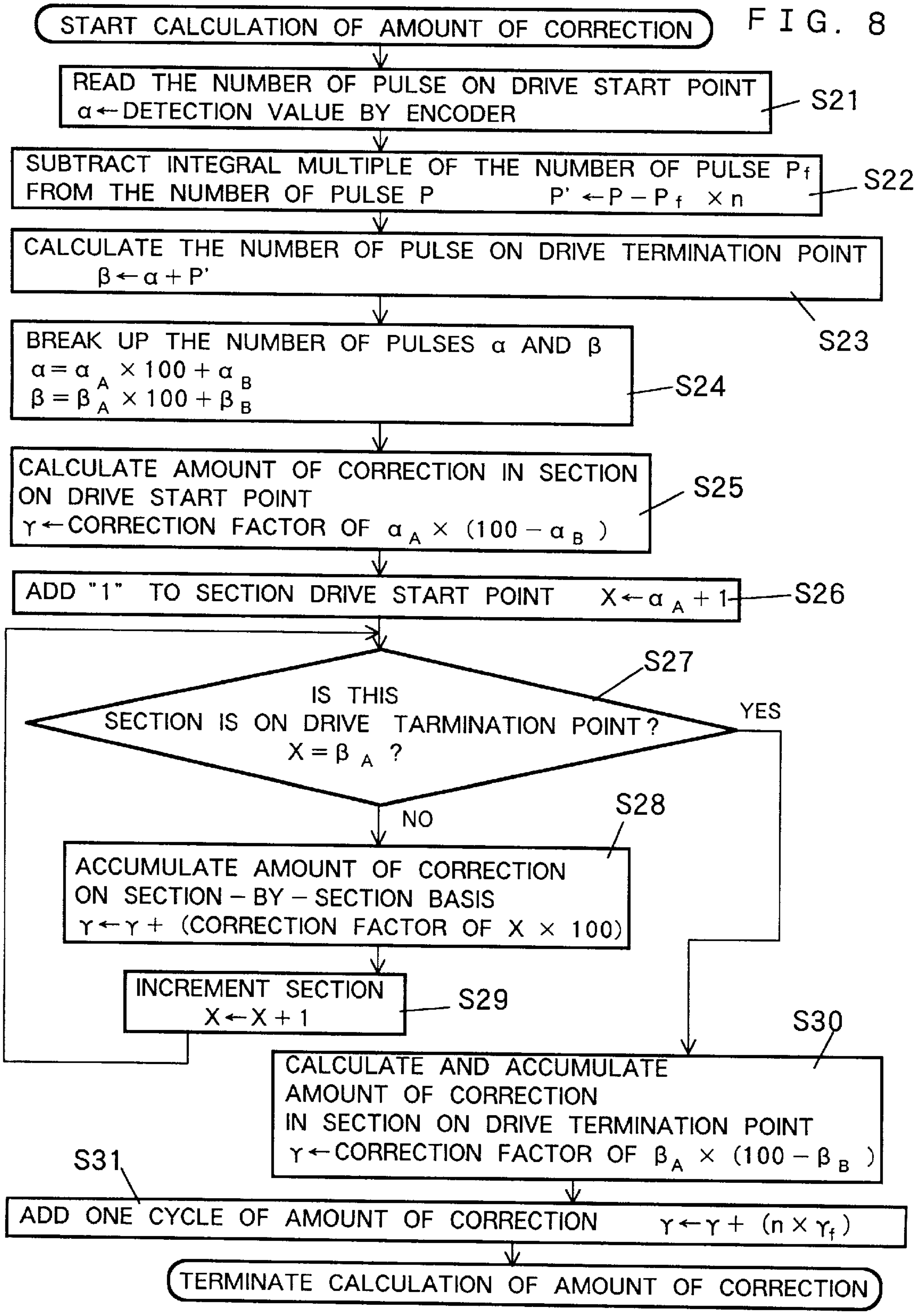
FIG. 8 is a flow chart to calculate the amount of correction in FIG. 7.

FIG. 7 is a flow chart for describing the control of print processing including the control for correcting the sheet feed amount by the use of the correction value table. FIG. 8 is a flow chart for calculating the amount of correction. A method of controlling the correction of the sheet feed amount by the correction value table stored in the EEPROM 30 will be described with reference to FIGS. 7 and 8. The CPU 23 is adapted such that, when a power source of a device is turned on, in accordance with an input from the reference sensor 31, data indicating which pulse from the reference point the current rotation position of the feed roller 11 is located is written in an appropriate area in RAM 22 and then the data indicative of the rotation position is updated (rewritten) whenever the pulse motor 15 is driven.

In FIG. 7, in the first place, as soon as a print operation is started, the sheet is fed into the print unit 3 by the sheet feed mechanism 4 (S1). At this time, when an accumulated sheet feed amount B is detected, an initialization is executed (the accumulated sheet feed amount B is set to 0) (S2). Next, whether or not all print data is printed is judged (S3). If all the print data is not printed, whether or not one scan of print data is prepared in the CPU 23 is judged (S5). If the print data is not prepared, this judgment is repeated until the print data is prepared. When the print data is prepared, a sheet feed amount A corresponding to one scan of print is determined (S6). Next, the judgment is made as to whether or not the print data is empty, that is, whether or not a blank line is inserted without printing in the subsequent scan (S7). When the print data is empty, that is, the print is not carried out in the subsequent scan, the sheet feed amount A is accumulated (S8), and then the processing is returned to a step before the step (S3) of judging whether or not all the print data is printed. When the print data is not empty, a sheet feed amount C required for the subsequent print (obtained by adding the accumulated sheet feed amount B to the sheet feed amount A corresponding to one scan of print) is determined (S9). Next, the number of pulses β on a drive termination point is calculated from the number of pulses α on a drive start point that is a current rotation stop position and the number of pulses P corresponding to the sheet feed amount C, and then an amount of correction γ is calculated in accordance with the correction factors in the sections from the drive start point α to the drive termination point β (S10). The amount of correction γ is added to the sheet feed amount C necessary for the print (S11), and the sheet feed is executed (S12). The print head 7 is then scanned by driving the carriage motor 19 (see FIG. 3), and the print is executed (S13). After the print is terminated, the processing is again returned to the step before the step (S3) of judging whether or not all the print data is printed. This processing is repeated until all the print data is printed. When all the print data is printed, the sheet is discharged from the print unit 3 (S4), and then the print processing is terminated. In such a manner, a predetermined print processing is achieved on the sheet.

The step (S10) of calculating the amount of correction γ will be described below with reference to FIGS. 5, 6 and 8. In this description, it is taken as an example that the correction value (correction factor) in a specific cycle as shown in FIG. 5 is such that the number of pulses a on the drive start point detected from the encoder 16 is 240 pulses and the number of pulses P corresponding to the sheet feed amount C needed for the print is 2630 pulses.

As shown in FIG. 8, when the calculation of the amount of correction γ is started, the number of pulses α on the drive start point is first read from a predetermined storage area in the RAM 22 storing the current rotation position data therein (S21). Next, in order to find the number of pulses β on the drive termination point, an integral multiple n of the number of pulses $P_f$ corresponding to one cycle is subtracted from the number of pulses P corresponding to the sheet feed amount C (S22). The number of pulses α on the drive start point is added to the number of pulses P' that is the remainder resulting from the subtraction (S23). The subtraction of the integral multiple n of the number of pulses $P_f$ corresponding to one cycle from the number of pulses P corresponding to the sheet feed amount C is done in order to add plural cycles of amount of correction together at a time later. When the number of pulses P corresponding to the sheet feed amount C is 2630 pulses, the number of pulses P' that is the remainder resulting from the subtraction is $2630(P)-1000(P_f)\times2(n)=630$. The number of pulses β on the drive termination point is $240(\alpha)+630(P')=870$.

Next, the number of pulses α on the drive start point is broken up into a multiple $\alpha_A$ of the number of pulses in the section and the number of pulses $\alpha_B$ of the remainder, and the number of pulses β on the drive termination point is broken up into a multiple $\beta_A$ of the number of pulses in the section and the number of pulses $\beta_B$ of the remainder (S24). When the number of pulses α on the drive start point is 240 pulses, $240(\alpha)=2(\alpha_A)\times100(\text{section})+40(\alpha_B)$. When the number of pulses β on the drive termination point is 870 pulses, $870(\beta)=8(\beta_A)\times100(\text{section})+70(\beta_B)$. The correction factor corresponding to the section $\alpha_A$ on the drive start point is selected from the correction value table shown in FIG. 6, and the fractional number of pulses in the section on the drive start point is corrected in accordance with this correction factor so as to thereby calculate the amount of correction γ in the section on the drive start point (S25). In this case, since the correction factor is 2% and the fraction is 100−40 ($\alpha_B$) pulses, the amount of correction γ in the section on the drive start point is $0.02\times60=1.2$ pulse. Next, the corresponding correction factors are selected on the section-by-section basis from the section next to the section $\alpha_A$ on the drive start point to the section prior to the section $\beta_A$ on the drive termination point, and then the amount of correction is calculated and accumulated on the section-by-section basis (S26 to S29). That is to say, after adding 1 to the section on the drive start point (S26), whether or not the section X is the section $\beta_A$ on the drive termination point is judged (S27). If the section X is not the section $\beta_A$ on the drive termination point, the correction factor corresponding to the section X is selected from the correction value table shown in FIG. 6, and the amount of correction in the section X is calculated in accordance with this correction factor, so that this amount of correction is accumulated (S28). Next, the section X is incremented (S29), and this step is repeated until the section X reaches to the section $\beta_A$ on the drive termination point. In this case, the amounts of correction in the sections are calculated and accumulated in accordance with the correction factors from the third section to the seventh section, and thus the amount of correction in these sections is $0.04\times100+0.03\times100+0.02\times100+0.01\times100+(-0.01)\times100=9$ pulses. 9 pulses are added to the amount of correction on the drive start point, namely, 1.2 pulse, resulting in the amount of correction γ of 10.2 pulses.

When the section X reaches to the section $\beta_A$ on the drive termination point, the fractional number of pulses in the section $\beta_A$ on the drive termination point is corrected in accordance with the correction factor corresponding to the section $\beta_A$ on the drive termination point, the amount of correction in the section $\beta_A$ on the drive termination point is calculated, and this amount of correction is accumulated to the amount of correction γ (S30).

In this case, since the correction factor is −2% and the fraction is 70($\beta_B$), the amount of correction in the section $\beta_A$ on the drive termination point is −0.02×70=−1.4 pulse. −1.4 pulse is added to the accumulated amount of correction, 10.2 pulses, resulting in 8.8 pulses. Finally, the integral multiple n of an amount of correction $\gamma_f$ corresponding to one cycle is added to 8.8 pulses (S31), so that the calculation of the amount of correction γ is terminated. One cycle of amount of correction $\gamma_f$ is obtained by summing the correction factors in the correction value table shown in FIG. 6: 0.01×100+0.02×100+0.02×100+0.04×100+0.03×100+0.02×100+0.01×100+(−1)×100+(−2)×100+(−2)×100=10 pulses. Therefore, in the case of two cycles, the amount of correction is 20 pulses, the accumulated amount of correction 8.8 pulses are added to 20 pulses, and consequently the amount of correction γ is calculated that it is 28.8 pulses.

When the fraction is less than 1 pulse, it is difficult to step-drive the pulse motor 15 at the pulse still finer than 1 pulse. Thus, for example, an appropriate rounding is performed, and then the amount of correction γ is added to the sheet feed amount C required for the print. As an example, the amount of correction γ is rounded to the first digit and results in 29 pulses. The sheet feed amount 2630 pulses are added to 29 pulses, so that the amount of correction γ results in 2659 pulses. Therefore, the pulse motor 15 is driven by 2659 pulses, whereby the sheet can be fed at a predetermined amount regardless of the feed error inherent to the device. When the amount of correction γ has the fraction less than 1 pulse, the fraction not employed for the actual sheet feed or the deficiency resulting from raising to a unit may be, of course, stored in the appropriate area in the RAM 22 in consideration of the determination of the subsequent amount of correction γ, for example.

According to the above structure, even if there generates deflection of the feed roller 11 and the gears which transmit the driving power of the pulse motor 15 to the feed roller 11, the sheet feed is performed at the sheet feed amount that is properly corrected by the correction factor set corresponding to the sheet feed error in the specific cycle. Thus, the feed error caused by the deflection of the sheet feeding mechanism 10, especially, the feed roller 11 or the gears which transmit the power from the pulse motor 15 to the feed roller 11 can be easily corrected. As a result, without necessitating the increase of precision of components of the sheet feeding mechanism 10, the feed error of each component of the sheet feeding mechanism 10 can be canceled, so that an exact and reliable sheet feed can be achieved. In this case, since the correction factor is set corresponding to the feed error in each of plural divided sections of the specific cycle, the exact and reliable sheet feed can be performed by even a simple structure. Accordingly, the sheet feeding device can achieve desired sheet feed by a simple structure, preventing an increased cost, so that the printing apparatus 1 having the sheet feeding device can perform proper printing operation.

In the above embodiment, the feed error appearing in the specific cycle in the sheet feeding mechanism 10 is found as the cycle of feed error of the feed roller 11 by detecting the rotation angle of the feed roller 11 by the encoder 16. However, instead of the cycle of the feed error of the feed roller 11, the feed error of the sheet feeding mechanism 10 may be found as any detectable cycle which is caused by sheet feed error, for example, as the cycle of the actual sheet feed error by detecting, for example, the displacement amount of sheet feed by a laser sensor and the like. The position to measure the feed error may be set in any point of the sheet feeding mechanism, for example, in the case of a mechanism in which plural gears are arranged, a middle gear may be used to measure the error to be corrected. In this case, however, it should be arranged so that no feed error is generated in the components arranged subsequent to the measuring point.

In the above embodiment, although the correction value table stores the correction value for the feed error, set corresponding to each of the plural divided sections of the specific cycle, it may stores the correction value for the feed error detected continuously by the encoder 16.

Furthermore, the reference sensor 31 is used as a detector for detecting a particular point (rotation position) in the above embodiment, which is not limited to the sensor. For instance, there may be arranged a stopper mechanism which is not activated when the pulse motor 15 is regularly rotated to feed a sheet in a predetermined direction from the supply tray 5 to the output tray 9, while it is activated only when the pulse motor 15 is reversely rotated, whereby to measure the feed error by considering the halt position of the feed roller 11 stopped by the stopper mechanism as a specific rotation position. For example, the particular point (rotation position) can be detected if the device is arranged such that, when the power source of the device is turned on, the pulse motor 15 which is reversely rotated in advance is pulse-driven until the pulse motor 15 becomes out-of-step, namely, even after the rotation of the feed roller 11 is stopped by the stopper mechanism mentioned above. For a manner for detecting the particular point by only the regular rotation of the pulse motor, in stead of the reverse rotation, for example, it may utilize a stopper member such that, when a signal to start the detection of an original point is generated, the stopper member is allowed to extrude to the position where it operates on a part of a drive system to stop it, and then to move back to the non-operational position upon detection of the particular point (rotation position) as well as in the above manner.

Although the description of the sheet feeding device is made taking an example of the printing apparatus 1 in the embodiment, the present invention can widely be applied to image forming apparatus such as a copy machine, a facsimile device, and others.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A sheet feeding device comprising a sheet feeding mechanism and a drive-controller for drive-controlling the sheet feeding mechanism, the sheet feeding device further comprising:

a correction value storage memory which stores correction values each corresponding to one of plural points in a specific cycle, the correction values being to be used for correcting sheet feed error of the sheet feeding mechanism, which appears in the specific cycle from a reference point; and a detector which detects the reference point in the specific cycle;

wherein when the reference point in the specific cycle is detected by the detector, the drive-controller corrects the sheet feed amount of the sheet feeding mechanism in accordance with the correction values stored in the correction value storage memory.

2. A sheet feeding device according to claim 1, wherein the specific cycle is divided into a plurality of sections, and the correction values stored in the correction value storage memory are in a one-to-one correspondence with the sections.

3. A sheet feeding device according to claim 2, wherein the sheet feeding mechanism comprises:

a plurality of rollers for feeding a sheet, each of the rollers being supported on a roller shaft; and a pulse motor which is operated by drive pulses applied from the drive controller and thereby drives each of the roller to rotate.

4. A sheet feeding device according to claim 3, wherein the correction values stored in the correction value storage memory and the sheet feed amount of the sheet feeding mechanism are individually determined by a number of drive pulses to be applied to the pulse motor, and the drive controller corrects the sheet feed amount based on the number of drive pulses.

5. A sheet feeding device according to claim 4, wherein a minimum unit of the sheet feed amount is specified by a particular number of drive pulses to be applied to the pulse motor.

6. A sheet feeding device according to claim 5, further comprising a print head which prints image on the sheet fed by the sheet feeding mechanism, and the particular number of drive pulses corresponding to the minimum unit of the sheet feed amount is determined so that image of a predetermined resolution is printed on the sheet by the print head moving in a sheet feed direction of the sheet feeding mechanism.

7. A sheet feeding device according to claim 3, wherein the detector consists of a rotation sensor mounted on the roller shaft, said rotation sensor detecting the reference point by detecting a particular rotation position of the roller shaft.

8. A sheet feeding device according to claim 7, wherein the drive-controller starts to correct the sheet feed amount when the reference point is detected by the rotation sensor.

9. A sheet feeding device according to claim 8, wherein the rotation sensor comprises an optical sensor, or a magnetic sensor, or a mechanical sensor.

10. A sheet feeding device according to claim 4, further comprising an encoder attached to the roller shaft, wherein the sheet feed error is measured by counting the number of drive pulses applied to the pulse motor and detecting a rotating angle of the roller shaft by the encoder.

11. A sheet feeding device according to claim 4, wherein the correction values are set as a correction factor to a proper sheet feed amount of the sheet feeding mechanism in each of the sections.

12. A sheet feeding device according to claim 11, wherein each section of the specific cycle is specified by the number of drive pulses to be applied to the pulse motor, and a number of drive pulses to be corrected in the section is calculated by multiplying the number of drive pulses corresponding to each section by the correction factor.

13. A sheet feeding device according to claim 4, further comprising:

a print head which prints image on the sheet fed by the sheet feeding mechanism;

first calculation means for calculating a first number of drive pulses corresponding to a drive start point of the pulse motor from the reference point in the specific cycle detected by the detector;

second calculation means for accumulatively calculating a second number of drive pulses corresponding to a predetermined sheet feed amount needed for the print head to print image; and third calculation means for calculating a third number of drive pulses corresponding to a drive termination point of the pulse motor on a basis of the first number and the second number of drive pulses;

wherein the drive-controller calculates an amount of correction of the predetermined sheet feed amount based on the correction value corresponding to the section in the specific cycle from the drive start to termination points.

14. A sheet feeding device according to claim 13, wherein the drive-controller calculates a correction amount in each section in the specific cycle from the drive start point to the drive termination point based on the correction value corresponding to the section and accumulates the calculated correction amount to calculate an amount of correction for the predetermined sheet feed amount.

15. A correction method of sheet feed amount in a sheet feeding device comprising a sheet feeding mechanism and a drive-controller for drive-controlling the sheet feeding mechanism, the correction method comprising the steps of:

detecting sheet feed error of the sheet feeding mechanism, which appears in a specific cycle from a reference point;

storing correction values for the feed error in a correction value storage memory, the correction values being in one-by-one correspondence with a plurality of points in the specific cycle;

detecting the reference point in the specific cycle; and correcting the sheet feed amount of the sheet feeding mechanism in accordance with the correction values stored in the correction value storage memory when the reference point in the specific cycle is detected by a detector.

16. A correction method of sheet feed amount according to claim 15, wherein the storage step is to divide the specific cycle into a plurality of sections and store correction values corresponding to each section in the correction value storage memory.

* * * * *